United States Patent
Otsuka et al.

(10) Patent No.: US 6,437,723 B1
(45) Date of Patent: Aug. 20, 2002

(54) SIGNAL PROCESSING CIRCUIT AND SEMICONDUCTOR INTEGRATED CIRCUIT CONVERTING AC SIGNAL USING TWO VOLTAGE REFERENCE VALUES

(75) Inventors: Takeshi Otsuka, Gifu-ken; Kuniyuki Tani; Atsushi Wada, both of Ogaki, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/665,678

(22) Filed: Sep. 20, 2000

(30) Foreign Application Priority Data

| Sep. 24, 1999 | (JP) | 11-270838 |
| Feb. 28, 2000 | (JP) | 2000-050733 |
| Sep. 5, 2000 | (JP) | 2000-268129 |

(51) Int. Cl.[7] .............................. H03M 1/00
(52) U.S. Cl. ............................. 341/155; 341/118
(58) Field of Search ............... 341/118, 120, 341/143, 155

(56) References Cited

U.S. PATENT DOCUMENTS

| 5,459,679 A | * | 10/1995 | Ziperovich | 364/602 |
| 5,570,335 A | * | 10/1996 | Ogata et al. | 369/124 |
| 5,592,456 A | * | 1/1997 | Miyashita et al. | 369/59 |
| 6,025,965 A | * | 2/2000 | Ziperovich | 360/51 |

* cited by examiner

Primary Examiner—Howard L. Williams
(74) Attorney, Agent, or Firm—Armstrong, Westerman & Hattori, LLP

(57) ABSTRACT

A comparator converts an input analog RF signal to a digital signal and inputs the digital signal in a charge pump circuit. The charge pump circuit controls charging/discharging of an integration capacitor in response to the output level of the digital signal output from the comparator. The charging quantity of the integration capacitor is used as a reference voltage of an RF amplifier, and a center voltage level of the analog RF signal output from the RF amplifier is adjusted in response to an average dc level of the digital signal. Thus, it follows that a slice level of a signal reproducing circuit is properly controlled.

18 Claims, 9 Drawing Sheets

SIGNAL PROCESSING CIRCUIT AND SEMICONDUCTOR INTEGRATED CIRCUIT CONVERTING AC SIGNAL USING TWO VOLTAGE REFERENCE VALUES

BACKGROUND OF THE INVENTION

1. Field of the Invention

The present invention relates to a signal processing circuit and a semiconductor integrated circuit, and more particularly, it relates to a signal processing circuit and a semiconductor integrated circuit processing a signal recorded in an optical disk such as a CD (compact disk).

2. Description of the Prior Art

In order to reproduce a signal recorded in an optical disk such as a CD or a CD-ROM, an analog RF (radio frequency) signal read from the optical disk is converted to a digital signal with reference to a prescribed slice level. In general, the data recorded in the optical disk is an EFM (eight to fourteen modulation) signal, which is so set that a dc component thereof is basically zero. Therefore, the aforementioned slice level in the digital conversion is controlled to reach a center voltage level of the analog RF signal.

FIG. 9 is a circuit diagram showing the structure of a conventional signal reproducing circuit for an optical disk, including a digital conversion part and a slice level control part converting the aforementioned analog RF signal to a digital signal.

A signal read from an optical disk by an optical pickup is amplified by an RF amplifier 51, and supplied to an inversion input terminal of a comparator 53 through an input capacitor 52 for removing a dc component as an analog RF signal. The comparator 53 is a digital conversion part having a non-inversion input terminal supplied with a reference voltage Vref for comparing the aforementioned analog RF signal with the reference voltage Vref, converting the analog RF signal to a digital signal and outputting the same.

An end of a resistor 54 is connected between the capacitor 52 and the inversion input terminal of the comparator 53, and a positive electrode of an integration capacitor 55 is connected to the other end of the resistor 54 so that the center voltage level of the analog RF signal is adjusted by charging/discharging the integration capacitor 55.

A charge pump circuit 56 and a resistor 57 are provided between an output side of the comparator 53 and the positive electrode of the integration capacitor 55. The charge pump circuit 56 controls charging/discharging of the integration capacitor 55 in response to the output level of the digital signal output from the comparator 53. Thus, it follows that the charging quantity of the integration capacitor 55 is controlled in response to an average dc level of the output digital signal.

The integration capacitor 55 integrates the output of the comparator 53 through the charge pump circuit 56 and the resistor 57, for operating the average value of the digital signal. This average value is added to the analog RF signal through the resistor 54. Therefore, the center voltage level of the analog RF signal is adjusted in response to the voltage level of the positive electrode of the integration capacitor 55, i.e., the average dc level of the digital signal so that the slice level follows the center voltage level of the analog RF signal.

However, the aforementioned conventional signal reproducing circuit must be provided with the capacitor 52 for removing the dc component and the resistor 54, and hence the circuit area is disadvantageously enlarged to increase the cost. When the capacitor 52 and the resistor 54 are not built in the chip but externally provided, parasitic capacitances of the capacitor 52 and the resistor 54 are increased to result in difficulty in speeding up the operations.

SUMMARY OF THE INVENTION

An object of the present invention is to provide a signal processing circuit and a semiconductor integrated circuit capable of implementing a function of adjusting a slice level with a small-scale circuit area while keeping the circuit at a high speed.

Another object of the present invention is to provide a signal processing circuit and a semiconductor integrated circuit capable of correctly detecting a dc component of an input signal.

A signal processing circuit according to an aspect of the present invention comprises an amplifier circuit amplifying an input signal, a conversion circuit converting an output from the amplifier circuit to a digital signal on the basis of a first reference value and a feedback circuit integrating the digital signal from the conversion circuit and feeding back the integrated digital signal as a second reference value of the amplifier circuit.

In this signal processing circuit, the amplifier circuit amplifies the input signal, the conversion circuit converts the output from the amplifier circuit to a digital signal on the basis of the first reference value, and the feedback circuit integrates the digital signal from the conversion circuit and feeds back the integrated digital signal as the second reference value of the amplifier circuit. Consequently, neither a capacitor for removing a dc component nor a resistor may be provided but it is possible to implement a function of adjusting a slice level with a small-scale circuit area while keeping the circuit at a high speed.

The amplifier circuit preferably amplifies the difference between the input signal and the second reference value. In this case, the difference between the input signal and the second reference value as fed back can be so amplified that the slice level can be properly controlled.

The amplifier circuit preferably includes at least two stages of amplifier circuits formed by a first amplifier circuit located on an input side and a second amplifier circuit located on an output side.

In this case, the first amplifier circuit can adjust the center voltage level of the input signal while the second amplifier circuit can amplify the input signal to a desired amplitude, so that the input signal can be amplified in high precision and output to the conversion circuit.

At least part of the amplifier circuit preferably includes a complete differential amplifier circuit, and one output of the complete differential amplifier circuit is preferably input in the conversion circuit as the first reference value.

In this case, the amplifier circuit can have a wide output range so that the amplification degree can be increased to operate the conversion circuit at a high speed and in-phase noise can be eliminated.

The feedback circuit preferably integrates the digital signal from the conversion circuit and feeds back the integrated digital signal to the first amplifier circuit.

In this case, the digital signal from the conversion circuit is integrated and fed back to the first amplifier circuit, whereby the center voltage level of the input signal can be adjusted in response to the level of the digital signal for properly controlling the slice level.

The feedback circuit preferably includes an integration capacitor and a charging/discharging circuit charging/ discharging the integration capacitor in response to the level of the digital signal from the conversion circuit.

In this case, the charging/discharging circuit charges/ discharges the integration capacitor in response to the level of the digital signal from the conversion circuit so that the center voltage level of the input signal can be adjusted in response to the level of the digital signal.

A signal processing circuit according to another aspect of the present invention comprises an amplifier circuit amplifying an input signal, a conversion circuit converting an output from the amplifier circuit to a digital signal on the basis of a first reference value and a detection circuit detecting a dc component of the signal not yet amplified by the amplifier circuit.

In this signal processing circuit, the amplifier circuit amplifies the input signal, the conversion circuit converts the output from the amplifier circuit to a digital signal on the basis of the first reference value, and the detection circuit detects the dc component of the signal not yet amplified by the amplifier circuit. Thus, it is possible to detect the dc component of the signal not yet subjected to amplification, i.e., the signal not yet subjected to adjustment of the center voltage level in response to the level of the digital signal from the conversion circuit, whereby the dc component of the input signal can be correctly detected.

The signal processing circuit preferably further comprises a feedback circuit integrating the digital signal from the conversion circuit and feeding back the integrated digital signal as a second reference value of the amplifier circuit.

In this case, the amplifier circuit amplifies the input signal, the conversion circuit converts the output from the amplifier circuit to a digital signal on the basis of the first reference value, and the feedback circuit integrates the digital signal from the conversion circuit and feeds back the integrated digital signal as the second reference value of the amplifier circuit. Consequently, neither a capacitor for removing a dc component nor a resistor may be provided but it is possible to implement a function of adjusting a slice level with a small-scale circuit area while keeping the circuit at a high speed.

The amplifier circuit preferably amplifies the difference between the input signal and the second reference value. In this case, the difference between the input signal and the second reference value as fed back can be so amplified that the slice level can be properly controlled.

The detection circuit preferably includes at least either a peak hold circuit detecting and holding a peak value of the signal not yet amplified by the amplifier circuit or a bottom hold circuit detecting and holding a bottom value of the signal not yet amplified by the amplifier circuit.

In this case, the peak hold circuit or the bottom hold circuit detects the peak value or the bottom value of the signal not yet amplified by the amplifier circuit, whereby it is possible to detect the peak value or the bottom value of the signal not yet subjected to adjustment of the center voltage level in response to the level of the digital signal from the conversion circuit, so that a correct peak or bottom value of the signal can be detected.

The detection circuit preferably includes at least two stages of detection amplifier circuits formed by a first detection amplifier circuit located on an input side and a second detection amplifier circuit located on an output side, a peak hold circuit detecting and holding a peak value of an output signal from the second detection amplifier circuit and a bottom hold circuit detecting and holding a bottom value of the output signal from the second detection amplifier circuit.

In this case, the first and second detection amplifier circuits amplify the signal not yet subjected to adjustment of the center voltage level in response to the level of the digital signal from the conversion circuit similarly to the amplifier circuit so that the peak value and the bottom value of the signal amplified to a desired amplitude can be detected, whereby a peak value and a bottom value of the signal can be more correctly detected.

The detection circuit preferably includes a first detection amplifier circuit located on an input side, a second detection amplifier circuit amplifying an output signal from the first detection amplifier circuit, a third detection amplifier circuit amplifying an output signal from the second detection amplifier circuit, a peak hold circuit detecting and holding a peak value of an output signal from the third detection amplifier circuit and a bottom hold circuit detecting and holding a bottom value of the output signal from the third detection amplifier circuit.

In this case, the first to third detection amplifier circuits amplify the signal not yet subjected to adjustment of the center voltage level in response to the level of the digital signal from the conversion circuit similarly to the amplifier circuit so that the peak value and the bottom value of the signal amplified to a desired amplitude can be detected, whereby a peak value and a bottom value of the signal can be more correctly detected.

The amplifier circuit preferably includes at least two stages of amplifier circuits formed by a first amplifier circuit located on an input side and a second amplifier circuit located on an output side.

In this case, the first amplifier circuit can adjust the center voltage level of the input signal while the second amplifier circuit can amplify the input signal to a desired amplitude, so that the input signal can be amplified in high precision and output to the conversion circuit.

At least part of the amplifier circuit preferably includes a complete differential amplifier circuit, and one output of the complete differential amplifier circuit is preferably output to the conversion circuit as the first reference value.

In this case, the amplifier circuit can have a wide output range so that the amplification degree can be increased to operate the conversion circuit at a high speed and in-phase noise can be eliminated.

The amplifier circuit preferably includes a first amplifier circuit located on an input side, a waveform shaping circuit shaping the waveform of an output signal from the first amplifier circuit, a second amplifier circuit amplifying an output signal from the waveform shaping circuit and a third amplifier circuit located on an output side for amplifying an output signal from the second amplifier circuit, the second and third amplifier circuits preferably include complete differential amplifier circuits, and one output of the third amplifier circuit is preferably input in the conversion circuit as the first reference value.

In this case, it is possible to adjust the center voltage level of the input signal with the first amplifier circuit, shape the waveform of the signal subjected to adjustment of the center voltage level with the waveform shaping circuit, and amplify the signal subjected to waveform shaping to a desired amplitude in two stages with the second and third amplifier circuits. Further, complete differential amplifier circuits are employed as the second and third amplifier circuits, whereby the amplifier circuit can have a wide output range so that the amplification degree can be increased to operate the conversion circuit at a high speed and in-phase noise can be eliminated.

The feedback circuit preferably integrates the digital signal from the conversion circuit and feeds back the integrated digital signal to the first amplifier circuit.

In this case, the digital signal from the conversion circuit is integrated and fed back to the first amplifier circuit, whereby the center voltage level of the input signal can be adjusted in response to the level of the digital signal and a slice level can be properly controlled.

The feedback circuit preferably includes an integration capacitor and a charging/discharging circuit charging/discharging the integration capacitor in response to the level of the digital signal from the conversion circuit.

In this case, the charging/discharging circuit charges/discharges the integration capacitor in response to the level of the digital signal from the conversion circuit, so that the center voltage level of the input signal can be adjusted in response to the level of the digital signal.

A semiconductor integrated circuit according to still another aspect of the present invention comprises a signal processing circuit processing an output signal from an optical pickup, the signal processing circuit is integrated with another circuit into one chip by a CMOS integrated circuit, and the signal processing circuit includes an amplifier circuit amplifying the output signal from the optical pickup, a conversion circuit converting an output from the amplifier circuit to a digital signal on the basis of a first reference value and a feedback circuit integrating the digital signal from the conversion circuit and feeding back the integrated digital signal as a second reference value of the amplifier circuit.

In this semiconductor integrated circuit, the signal processing circuit amplifying the output signal from the optical pickup is formed by a signal processing circuit capable of implementing a function of adjusting a slice level with a small-scale circuit area while keeping the circuit at a high speed and this signal processing circuit is integrated with another circuit into one chip by a CMOS integrated circuit. Thus, it is possible to implement a one-chip CMOS integrated circuit for an optical disk drive capable of implementing a function of adjusting a slice level with a small-scale circuit area while keeping a high speed.

The signal processing circuit preferably further includes a detection circuit detecting a dc component of the signal not yet amplified by the amplifier circuit.

In this case, it is possible to detect the dc component of the signal not yet subjected to amplification, i.e., the signal not yet subjected to adjustment of the center voltage level in response to the level of the digital signal from the conversion circuit, whereby a dc component of the signal can be correctly detected.

The detection circuit preferably includes at least either a peak hold circuit detecting and holding a peak value of the signal not yet amplified by the amplifier circuit or a bottom hold circuit detecting and holding a bottom value of the signal not yet amplified by the amplifier circuit.

In this case, the peak hold circuit or the bottom hold circuit detects the peak value or the bottom value of the signal not yet amplified by the amplifier circuit, whereby it is possible to detect the peak value or the bottom value of the signal not yet subjected to adjustment of the center voltage level in response to the level of the digital signal from the conversion circuit, so that a correct peak or bottom value of the signal can be detected.

The amplifier circuit preferably includes at least two stages of amplifier circuits formed by a first amplifier circuit located on an input side and a second amplifier circuit located on an output side.

In this case, the first amplifier circuit can adjust the center voltage level of the input signal while the second amplifier circuit can amplify the input signal to a desired amplitude, so that the input signal can be amplified in high precision and output to the conversion circuit.

The feedback circuit preferably integrates the digital signal from the conversion circuit and feeds back the integrated digital signal to the first amplifier circuit.

In this case, the digital signal from the conversion circuit is integrated and fed back to the first amplifier circuit, whereby the center voltage level of the input signal can be adjusted in response to the level of the digital signal and a slice level can be properly controlled.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
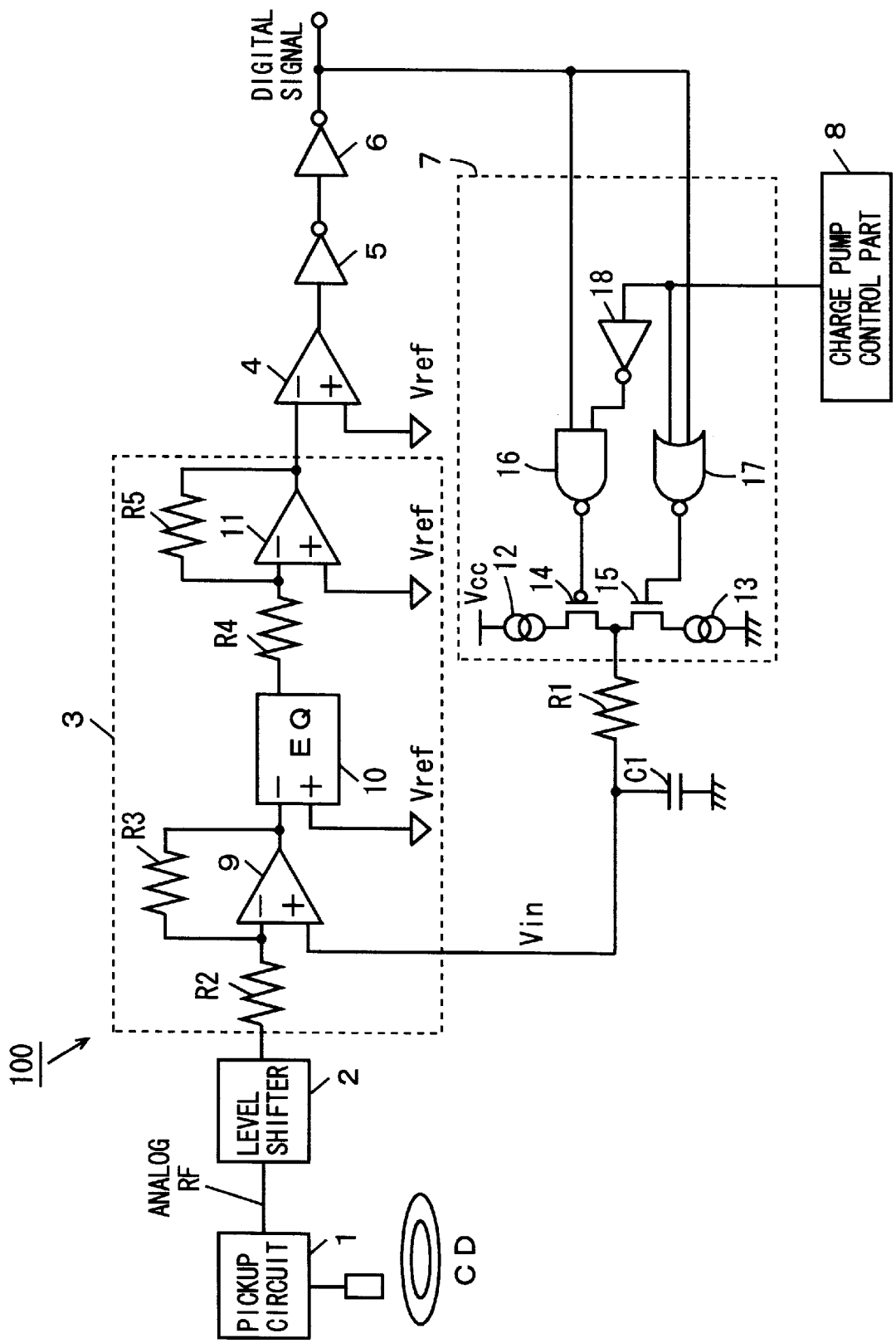
FIG. 1 is a circuit diagram showing the structure of a signal reproducing circuit for an optical disk according to a first embodiment of the present invention.

A signal reproducing circuit for an optical disk according to a first embodiment of the present invention is now described with reference to FIG. 1. FIG. 1 shows a signal reproducing circuit 100 for converting an analog signal recorded in an optical disk to a digital signal according to the first embodiment of the present invention.

A signal read from the optical disk by an optical pickup and output from the pickup is input in a level shifter 2 through a pickup circuit 1, level-shifted by the level shifter 2, input in an inversion input terminal of an RF amplifier 3 and amplified by the RF amplifier 3. The amplified signal is supplied to an inversion input terminal of a comparator 4 as an analog RF signal. The comparator 4 is a digital conversion part having a non-inversion input terminal supplied with a constant reference voltage Vref for comparing the aforementioned analog RF signal with this reference voltage Vref, converting the analog RF signal to a digital signal and outputting the digital signal.

In this embodiment, the RF amplifier 3 corresponds to the amplifier circuit, the comparator 4 corresponds to the conversion circuit, the reference voltage Vref corresponds to the first reference value, and the signal output from the pickup and level-shifted by the level shifter 2 corresponds to the signal input in the amplifier circuit.

The aforementioned digital signal is supplied to a rear-stage signal processing part (not shown) through inverters 5 and 6, so that a sound signal and an image signal are reproduced on the basis of the digital signal.

The digital signal is input from the inverter 6 in a charge pump circuit 7. An output side of the charge pump circuit 7 is connected to a non-inversion input terminal of a first operational amplifier circuit 9 of the RF amplifier 3 through a resistor R1.

A charge pump control part 8 outputs a low-level signal to the charge pump circuit 7 for adjusting a slice level of the signal reproducing circuit 100 while outputting a high-level signal to the charge pump circuit 7 for holding the slice level.

A positive electrode of an integration capacitor C1 for shifting a center voltage level of the analog RF signal by charging/discharging is connected between the resistor R1 and the non-inversion input terminal of the RF amplifier 3.

The RF amplifier 3 has a structure formed by successively directly coupling the first operational amplifier circuit 9, a waveform shaping circuit 10 and a second operational amplifier circuit 11. A resistor R2 is connected between the level shifter 2 and an inversion input terminal of the first operational amplifier circuit 9, a resistor R3 is connected between the non-inversion input terminal and an output terminal of the first operational amplifier circuit 9, and the output terminal of the first operational amplifier circuit 9 is connected to an inversion input terminal of the waveform shaping circuit 10. A resistor R4 is connected between an output terminal of the waveform shaping circuit 10 and an inversion input terminal of the second operational amplifier circuit 11, and a resistor R5 is connected between the inversion input terminal and an output terminal of the second operational amplifier circuit 11.

The signal from the level shifter 2 is input in the inversion input terminal of the first operational amplifier circuit 9, and a reference voltage V in based on the charging quantity of the integration capacitor C1 is input in the non-inversion input terminal. In this embodiment, the first operational amplifier circuit 9 corresponds to the first amplifier circuit, and the reference voltage Vin corresponds to the second reference value.

According to this embodiment, the RF amplifier 3 has the multistage series structure of the first operational amplifier 9 and the second operational amplifier circuit 11 holding the waveform shaping circuit 10 therebetween, so that the input-stage first operational amplifier circuit 9 has the function of adjusting the center voltage level of the output signal while the output-stage second operational amplifier circuit 11 has the function of amplifying the analog RF signal to a desired amplitude. In this embodiment, the second operational amplifier circuit 11 corresponds to the second amplifier circuit.

The same reference voltage Vref as that for the comparator 4 is employed as the reference voltage for the waveform shaping circuit 10 and the second operational amplifier circuit 11, and this reference voltage Vref is input in the non-inversion input terminals of the waveform shaping circuit 10 and the second operational amplifier circuit 11.

The structure of the charge pump circuit 7 is now described. A P-channel transistor 14 and an N-channel transistor 15 are provided in this order between a power source Vcc and a ground potential GND through constant current sources 12 and 13 respectively, and the node between the two transistors 14 and 15 is connected to an end of the resistor R1. The gate electrode of the transistor 14 is connected with an output side of a NAND circuit 16, while the gate electrode of the transistor 15 is connected with an output side of a NOR circuit 17.

First input terminals of the NAND circuit 16 and the NOR circuit 17 are connected with an output side of the inverter 6 respectively. A second input terminal of the NOR circuit 17 is connected with the charge pump control part 8, while a second input terminal of the NAND circuit 16 is also connected with the charge pump control part 8 through an inverter 18.

When a control signal from the charge pump control part 8 is low for adjusting the slice level, a low-level voltage is applied to the gate electrodes of the transistors 14 and in the charge pump circuit 7 if an output from the inverter 6 is high (an output from the comparator 4 is high), for example, so that only the transistor 14 is turned on and a current flows from the power source Vcc through the transistor 14 for charging the integration capacitor C1 through the resistor R1.

When the output from the comparator 4 is low, on the other hand, a high-level voltage is applied to the gate electrodes of the transistors 14 and 15 so that only the transistor 15 is turned on to draw a current from the output side, for discharging the integration capacitor C1 through the resistor R1.

When the control signal from the charge pump control part 8 is high for holding the slice level; a high-level voltage is applied to the gate electrode of the transistor 14 while a low-level voltage is applied to the gate electrode of the transistor 15 regardless of the output level from the comparator 4. Therefore, both transistors 14 and 15 are turned off to stop charging/discharging the integration capacitor C1, thereby holding the slice level in the comparator 4. In this embodiment, the integration capacitor C1, the resistor R1 and the charge pump circuit 7 correspond to the feedback circuit, and the charge pump circuit 7 corresponds to the charging/discharging circuit.

On the basis of the aforementioned structure, operations for adjusting the slice level of the signal reproducing circuit 100 are now described.

In this case, the charge pump control circuit 8 outputs a low-level signal to the charge pump circuit 7. At this time, the signal read from the optical disk by the optical pickup and output from the pickup is level-shifted by the level shifter 2 and differentially amplified by the first operational amplifier circuit 9. The differentially amplified signal is processed by the waveform shaping circuit 10 and thereafter further differentially amplified by the second operational amplifier circuit 11, to be supplied to the inversion input terminal of the comparator 4 as an analog RF signal.

The comparator 4 converts the input analog RF signal to a digital signal and inputs the digital signal in the charge pump circuit 7 through the inverters 5 and 6. The charge pump circuit 7 controls charging/discharging of the integration capacitor C1 in response to whether the level of the digital signal output from the comparator 4 is high or low, as described above. Thus, it follows that the charging quantity of the integration capacitor C1 is controlled in response to the average dc level of the digital signal.

The charging quantity of the integration capacitor C1 is used as the reference voltage Vin of the first operational amplifier circuit 9 of the RF amplifier 3, and hence the center voltage level of the analog RF signal output from the RF amplifier 3 is regularly adjusted in response to the voltage level of the positive electrode of the integration capacitor C1, i.e., the average dc level of the digital signal. The comparator 4 correctly converts the analog RF signal to a digital signal on the basis of the reference voltage Vref supplied to the non-inversion input terminal and outputs the digital signal.

Thus, the center voltage level of the analog RF signal is adjusted in response to the average dc level of the digital signal and the digital signal of the comparator 4 is controlled to follow the center voltage level of the analog RF signal, whereby it follows that the slice level of the signal reproducing circuit 100 is properly controlled as a result.

When the level of the analog RF signal is reduced, the charge pump circuit 7 discharges the integration capacitor C1 following this level reduction for reducing the potential (the reference voltage Vin) of the non-inversion input terminal of the first operational amplifier circuit 9 of the RF amplifier 3 so that the analog RF signal can be prevented from level fluctuation after output from the first operational amplifier circuit 9 in this embodiment as described above, whereby the digital signal has a proper output level.

While the average value of the digital signal integrated by the integration capacitor C1 may be supplied as the reference value of the comparator 4, both signals in the inversion input terminal and the non-inversion input terminal of the comparator 4 fluctuate to widen the operating range of the comparator 4. In this case, it is undesirably difficult to design the comparator 4.

Figure 2:
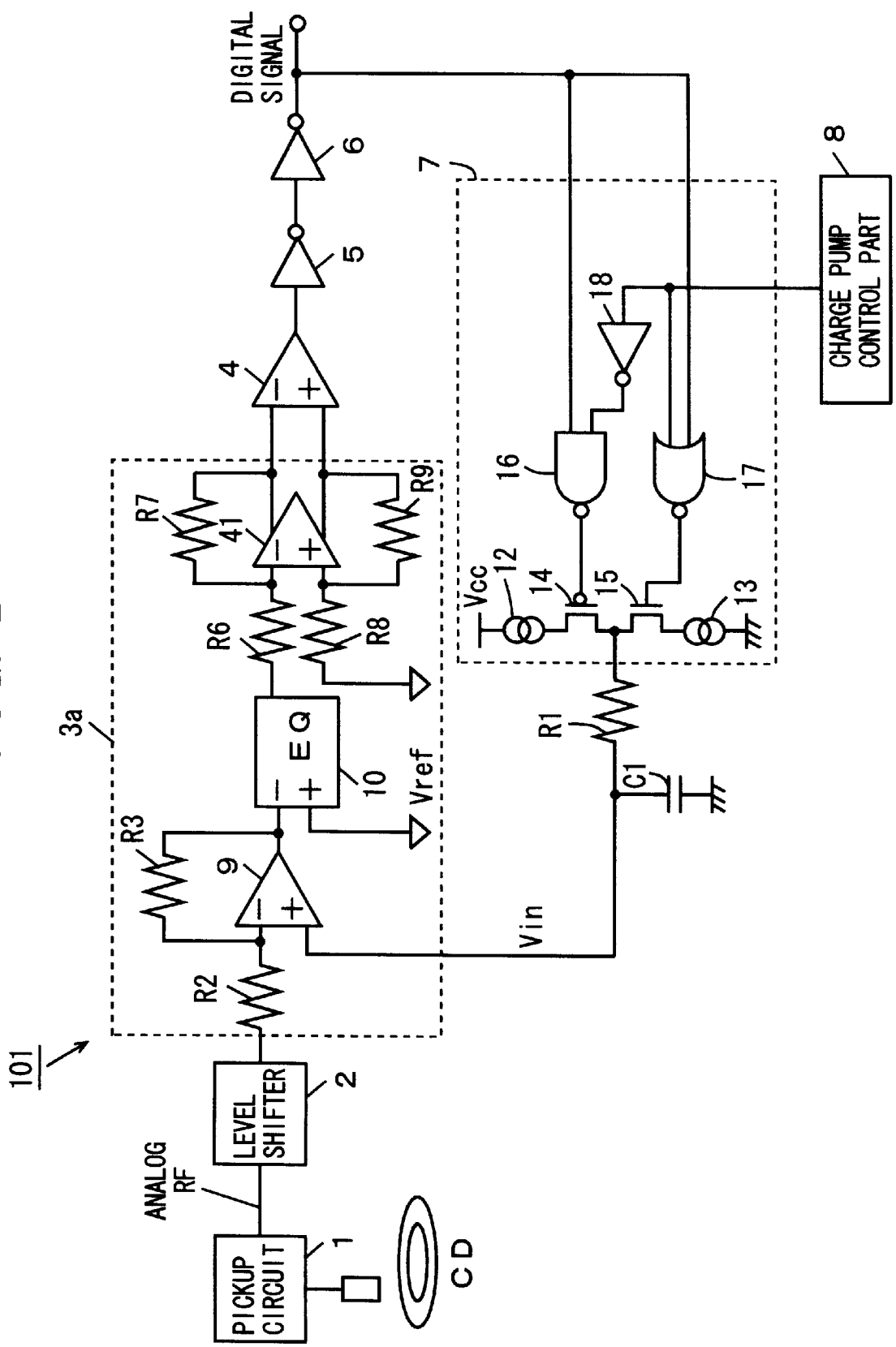
FIG. 2 is a circuit diagram showing the structure of a signal reproducing circuit for an optical disk according to a second embodiment of the present invention.

A signal reproducing circuit for an optical disk according to a second embodiment of the present invention is now described with reference to FIG. 2. FIG. 2 is a circuit diagram showing the structure of the signal reproducing circuit for an optical disk according to the second embodiment of the present invention. In the signal reproducing circuits shown in FIGS. 1 and 2, identical parts are denoted by the same reference numerals, to omit redundant description.

FIG. 2 shows a signal reproducing circuit 101 converting an analog signal recorded in an optical disk to a digital signal according to the second embodiment of the present invention. In this signal reproducing circuit 101, a complete differential operational amplifier circuit is employed as a second operational amplifier circuit 41 of an output stage of an RF amplifier 3a, a resistor R6 is connected to an inversion input terminal of the second operational amplifier circuit 41, a resistor R7 is connected between the inversion input terminal and an inversion output terminal, a resistor R8 is connected to a non-inversion input terminal, a resistor R9 is connected between the non-inversion input terminal and a non-inversion output terminal, an inverted output from the second operational amplifier circuit 41 is input in an inversion input terminal of a comparator 4, and a non-inverted output from the second operational amplifier circuit 41 is input in a non-inversion input terminal of the comparator 4.

When forming the second operational amplifier circuit 41 by a complete differential operational amplifier circuit and employing the non-inverted output from the second operational amplifier circuit 41 as the reference voltage of the comparator 4, a wide output range can be attained for increasing the amplification degree of the RF amplifier 3a and operating the rear-stage comparator 4 at a high speed while eliminating in-phase noise.

A CD reproducing apparatus including the signal reproducing circuit according to each of the aforementioned embodiments must be provided with a peak hold circuit detecting and holding a peak value of a signal output from a pickup and a bottom hold circuit detecting and holding a bottom value of the signal output from the pickup for correctly detecting a dc component of the signal output from the pickup and utilizing the same for error detection or servo control for correcting errors. The errors include a burst error caused by a flaw etc. of the disk, mirror modulation, a focus error, a tracking error and the like, and error correction includes gain control of an amplifier circuit, for example.

In order to detect the peak value and the bottom value of the signal output from the pickup, an analog RF signal amplified by an RF amplifier must generally be input in the peak hold circuit and the bottom hold circuit. In each of the aforementioned embodiments, however, the center voltage level of the analog RF signal output from the RF amplifier 3 or 3a is adjusted in response to the average dc level of the digital signal, and hence correct peak and bottom values (dc components) of the signal output from the pickup cannot be obtained from the analog RF signal output from the RF amplifier 3 or 3a.

Figure 3:
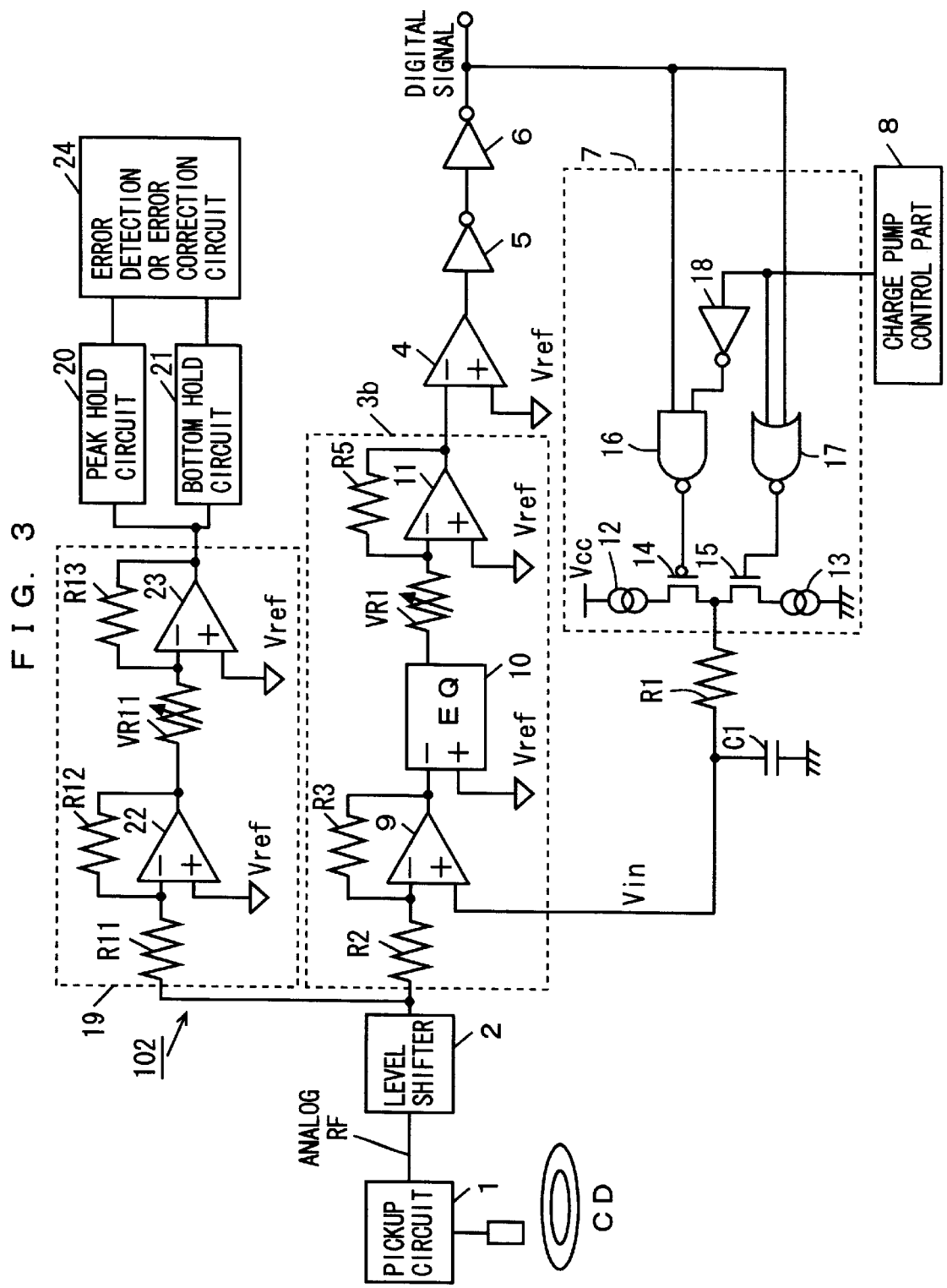
FIG. 3 is a circuit diagram showing the structure of a signal reproducing circuit for an optical disk according to a third embodiment of the present invention.

Therefore, a third embodiment of the present invention described below solves the aforementioned problem by detecting correct peak and bottom values of a signal output from a pickup and not yet input in an RF amplifier. FIG. 3 is a circuit diagram showing the structure of a signal reproducing circuit for an optical disk according to the third embodiment of the present invention. In the signal reproducing circuits shown in FIGS. 1 and 3, identical parts are denoted by the same reference numerals, to omit redundant description.

In the signal reproducing circuit 102 shown in FIG. 3, an RF amplifier 19 is provided in parallel with an RF amplifier 3b so that a signal (a signal level-shifted by a level shifter 2) output from a pickup and not yet input in the RF amplifier 3b is amplified by the RF amplifier 19 and the amplified analog RF signal is input in a peak hold circuit 20 and a bottom hold circuit 21.

The RF amplifier 19 has a multistage series structure formed by directly coupling a third operational amplifier circuit 22 and a fourth operational amplifier circuit 23 through a variable resistor VR11. The signal from the level shifter 2 is input in an inversion input terminal of the third operational amplifier circuit 22 through a resistor R11, a reference voltage Vref is input in a non-inversion input terminal of the third operational amplifier circuit 22, and a resistor R12 is connected between the inversion input terminal and an output terminal of the third operational amplifier circuit 22. The reference voltage Vref is input in a non-inversion input terminal of the fourth operational amplifier circuit 23, and a resistor R13 is connected between an inversion input terminal and an output terminal of the fourth operational amplifier circuit 23.

In this embodiment, the RF amplifier 19, the peak hold circuit 20 and the bottom hold circuit 21 correspond to the detection circuit, the third operational amplifier circuit 22 corresponds to the first detection amplifier circuit, and the fourth operational amplifier circuit 23 corresponds to the second detection amplifier circuit.

Outputs (a peak value and a bottom value) from the peak hold circuit 20 and the bottom hold circuit 21 are input in an error detection or correction circuit 24. An example of this error detection or correction circuit 24 is now described.

In tracking control or focus control in a CD reproducing apparatus including the signal reproducing circuit 102, servo control having a feedback loop is generally performed for satisfying requirement for high precision. In order to keep the servo control stable, an error between a controlled position and a target control position must be correctly grasped. Therefore, a pickup circuit 1 is generally provided with a detector 25 formed by a plurality of sensors shown in FIG. 4, for obtaining an error signal from the difference between outputs of the sensors.

Figure 4:
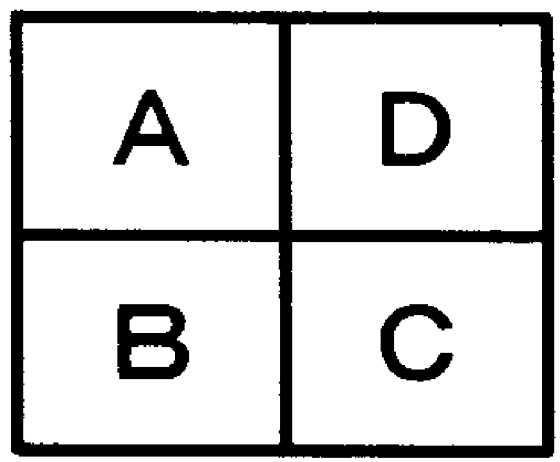
FIG. 4 is a schematic diagram showing the structure of a detector employed with the signal reproducing circuit shown in FIG. 3.

As shown in FIG. 4, the detector 25 is divided into six sensors A, B, C, D, E and F. For example, a focus error signal FE is generated by operating (A+C)−(B+D), and a tracking error signal TE is generated by operating (E−F) with the sensors E and F for a side spot.

Figure 5:
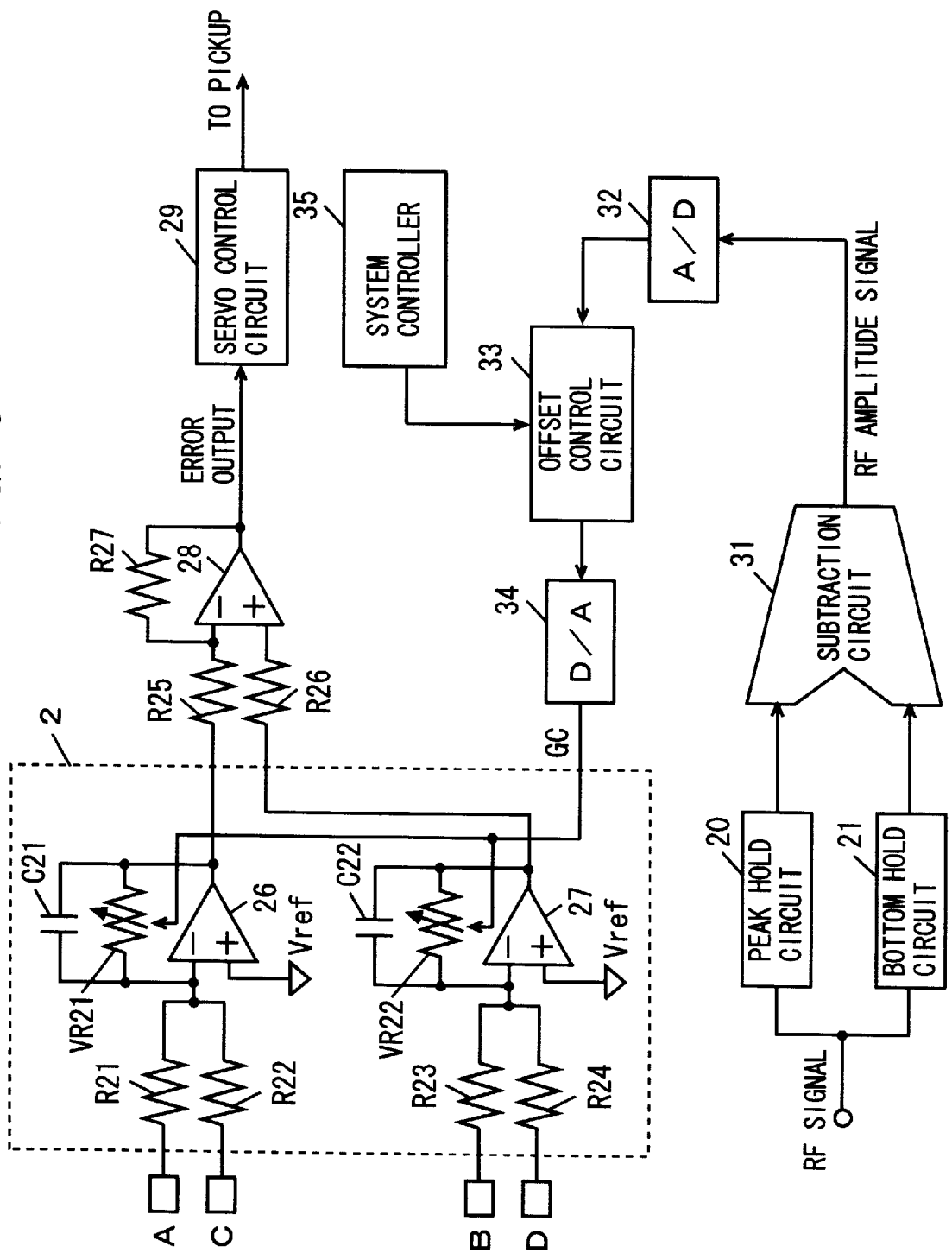
FIG. 5 is a circuit diagram showing the structure of an error detection or error correction circuit employed with the signal reproducing circuit shown in FIG. 3.

In the error detection or correction circuit 24, an output from a seventh operational amplifier circuit 28 receiving output signals from a level shifter 2 having a fifth operational amplifier circuit 26 amplifying a first sense output such as an added value of outputs from the sensors A and C (or an output of the sensor E), for example, and a sixth operational amplifier circuit 27 amplifying a second sensor output such as an added value of outputs from the sensors B and D (or an output of the sensor F), for example, and obtaining the difference between the outputs from the two amplifier circuits 26 and 27 is employed as an error signal, as shown in FIG. 5. The level shifter 2 shown in FIG. 5, identical to the level shifter 2 shown in FIG. 1 or the like, receives the outputs from the fifth operational amplifier circuit 26 and the sixth operational amplifier circuit 27 in a buffer (not shown) so that an output of this buffer is supplied to the RF amplifier 3 or the like in the case of FIG. 1 or the like.

The fifth operational amplifier circuit 26 and the sixth operational amplifier circuit 27 are formed by amplifier circuits gain-controllable with a gain control signal GC. The outputs of the sensors A and C are input in an inversion input terminal of the fifth operational amplifier circuit 26 through resistors R21 and R22, a reference voltage Vref is input in a non-inversion input terminal of the fifth operational amplifier circuit 26, and a capacitor C21 and a variable resistor VR21 are connected between the inversion input terminal and an output terminal of the fifth operational amplifier circuit 26. The outputs of the sensors B and D are input in an inversion input terminal of the sixth operational amplifier circuit 27 through resistors R23 and R24, the reference voltage Vref is input in a non-inversion input terminal of the sixth operational amplifier circuit 27, and a capacitor C22 and a variable resistor VR22 are connected between the inversion input terminal and an output terminal of the sixth operational amplifier circuit 27. Therefore, the gains of the fifth operational amplifier circuit 26 and the sixth operational amplifier circuit 27 are controlled by controlling the resistance values of the variable resistors VR21 and VR22 in response to the gain control signal GC.

Further, a resistor R25 is connected between the output terminal of the fifth operational amplifier circuit 26 and an inversion input terminal of the seventh operational amplifier circuit 28, a resistor R26 is connected between the output terminal of the sixth operational amplifier circuit 27 and a non-inversion input terminal of the seventh operational amplifier circuit 28, and a resistor R27 is connected between the non-inversion input terminal and an output terminal of the seventh operational amplifier circuit 28.

Therefore, the seventh operational amplifier circuit 28 obtains the difference between the outputs from the fifth and sixth operational amplifier circuits 26 and 27, so that a servo control circuit 29 performs focus control and tracking control on the basis of the error signal from the seventh operational amplifier circuit 28.

In the fifth and sixth operational amplifier circuits 26 and 27, the gain o f the fifth operational amplifier circuit 26 is increased and the gain of the sixth operational amplifier circuit 27 is reduced when the gain control signal GC is increased toward a positive side, while the gain of the sixth operational amplifier circuit 27 is increased and the gain of the fifth operational amplifier circuit 26 is reduced when the gain control signal GC is increased toward a negative side. Thus, the fifth and sixth operational amplifier circuits 26 and 27 having opposite gain characteristics are generally referred to as sensor output ratio control circuits.

The sensors A to F forming the detector 25 are dispersed in detection sensitivity and hence the error signal does not reach zero in practice but the so-called offset error occurs also when the object of control reaches the true target position. Therefore, the error detection or correction circuit 24 utilizes the outputs from the peak hold circuit 20 and the bottom hold circuit 21 for correcting this offset error.

In addition to the seventh operational amplifier circuit 28 and the servo control circuit 29, the error detection or correction circuit 24 includes a subtraction circuit 31, an A-D (analog-to-digital) converter 32, an offset control circuit 33 and a D-A (digital-to-analog) converter 34.

The subtraction circuit 31 performs subtraction on a peak value PH from the peak hold circuit 20 and a bottom value BH from the bottom hold circuit 21, and outputs the result (PH−BH) as an RF amplitude signal. The RF amplitude signal is maximized when the optical pickup is correctly located on the target control position.

The A-D converter 32 A-D converts the RF amplitude signal. The offset control circuit 33 performs control in response to a command from a system controller 35 for monitoring the A-D converted RF amplitude signal and outputting a digital gain control signal. The D-A converter 34 converts the digital gain control signal to an analog gain control signal GC.

When the system controller 35 outputs an automatic offset control command in the aforementioned structure, the offset control circuit 33 sets the gain control signal GC for the level shifter 2 to zero, captures the value of the RF amplitude signal from the subtraction circuit 31 and stores the same in an internal storage circuit.

Then, the offset control circuit 33 amplifies the gain control signal GC by ΔV toward a positive side, and determines whether or not the gain control signal GC is greater than the value of the RF amplitude signal when the gain control signal GC is zero. If the gain control signal GC is greater than the value of the RF amplitude signal, the offset control circuit 33 successively increases the gain control signal GC by ΔV and stores the value of the RF amplitude signal for determining whether or not the value of the RF amplitude signal is continuously increased.

When the increase stops, the offset control circuit 33 determines that the RF amplitude signal exceeds the maximum value and detects the maximum value from all stored values of the RF amplitude signal, reads the current value A of the gain control signal GC and thereafter holds the gain control signal GC at the value A.

If the gain control signal GC increased by ΔV toward the positive side is less than the value of the RF amplitude signal obtained when the gain control signal GC is zero, the off set control circuit 33 successively increases the gain control signal GC by ΔV toward a negative side and stores the value of the RF amplitude signal for determining whether or not the value of the RF amplitude signal is continuously increased.

When the increase stops, the offset control circuit 33 determines that the value of the RF amplitude signal exceeds the maximum value, detects the maximum value from all stored values of the RF amplitude signal, reads the current value B of the gain control signal GC and thereafter holds the gain control signal GC at the value B, similarly to the above.

Thus, when successively increasing the gain control signal GC, the outputs from the level shifter 2 serving as a sensor output ratio control circuit change, followed by change of the error signal from the seventh operational amplifier circuit 28. In this case, a tracking control signal from the servo control circuit 29 changes to successively change a position irradiated with a beam spot. In other words, the position irradiated with the beam spot is finely controlled within the range of a target track, and the RF amplitude signal generates the maximum output when the position irradiated with the beam spot correctly matches with the target position. If holding the gain control signal GC when the RF amplitude signal is maximized, therefore, it follows that an offset error corresponding to the value A or B is corrected.

As described above, the offset error can be corrected without moving the optical pickup itself, so that offset control can be performed while reproducing a CD. While the present invention is applied to focus servo control by fine control within the focal range, the present invention is also applicable to tracking servo control with a structure absolutely similar to the above, for implementing correction of an offset error.

According to this embodiment, as hereinabove described, the signal reproducing circuit 102 shown in FIG. 3 extracts the signal not yet amplified by the RF amplifier 3b for detecting the peak value and the bottom value, i.e., the dc components of the signal output from the pickup, whereby the dc components can be correctly detected for performing correct error detection and correct error correction.

According to this embodiment, a variable resistor VR1 is connected to an inversion input terminal of a second operational amplifier circuit 11 so that the gain of the second operational amplifier circuit 11 can be controlled by adjusting the resistance value of the variable resistor VR1.

Figure 6:
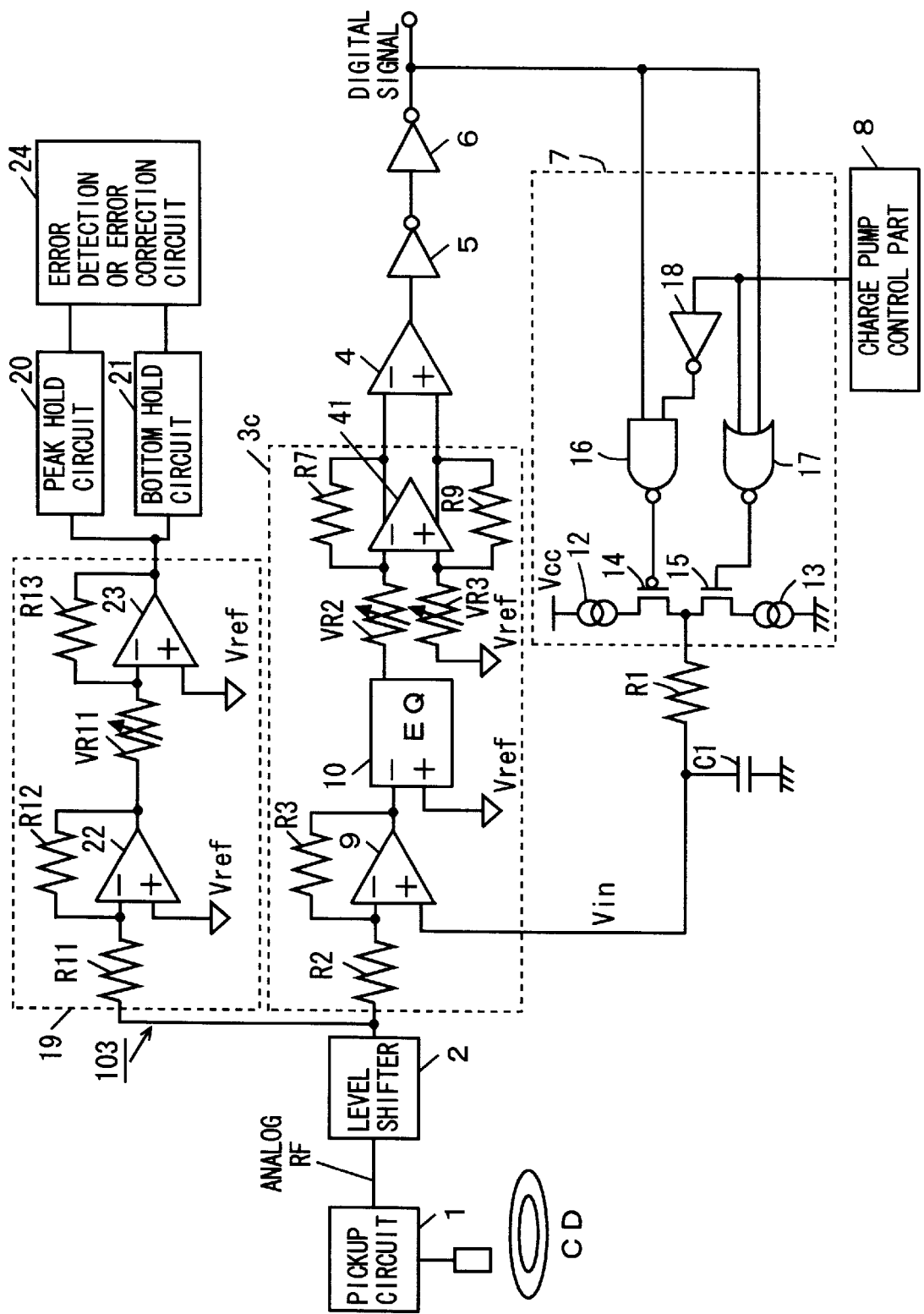
FIG. 6 is a circuit diagram showing the structure of a signal reproducing circuit for an optical disk according to a fourth embodiment of the present invention.

A signal reproducing circuit for an optical disk according to a fourth embodiment of the present invention is now described with reference to FIG. 6. FIG. 6 is a circuit diagram showing the structure of the signal reproducing circuit for an optical disk according to the fourth embodiment of the present invention. In the signal reproducing circuits shown in FIGS. 3 and 6, identical parts are denoted by the same reference numerals, to omit redundant description.

FIG. 6 shows a signal reproducing circuit 103 converting an analog signal stored in an optical disk to a digital signal according to the fourth embodiment of the present invention. In this signal reproducing circuit 103, a complete differential operational amplifier circuit is employed as a second operational amplifier circuit 41 of an output stage of an RF amplifier 3c, an inverted output from the second operational amplifier circuit 41 is input in an inversion input terminal of a comparator 4 and a non-inverted output from the second operational amplifier circuit 41 is input in a non-inversion input terminal of the comparator 4, similarly to the second embodiment.

When employing the complete differential operational amplifier circuit as the second operational amplifier circuit 41 while employing the non-inverted output from the second operational amplifier circuit 41 as a reference voltage of the comparator 4, a wide output range can be attained for increasing an amplification quantity of the RF amplifier 3c, operating the rear-stage comparator 4 at a high speed and eliminating in-phase noise.

Further, variable resistors VR2 and VR3 are connected to an inversion input terminal and a non-inversion input terminal of the second operational amplifier 41 respectively, so that the gain of the second operational amplifier circuit 41 can be controlled by adjusting the resistance values of the variable resistors VR2 and VR3.

Figure 7:
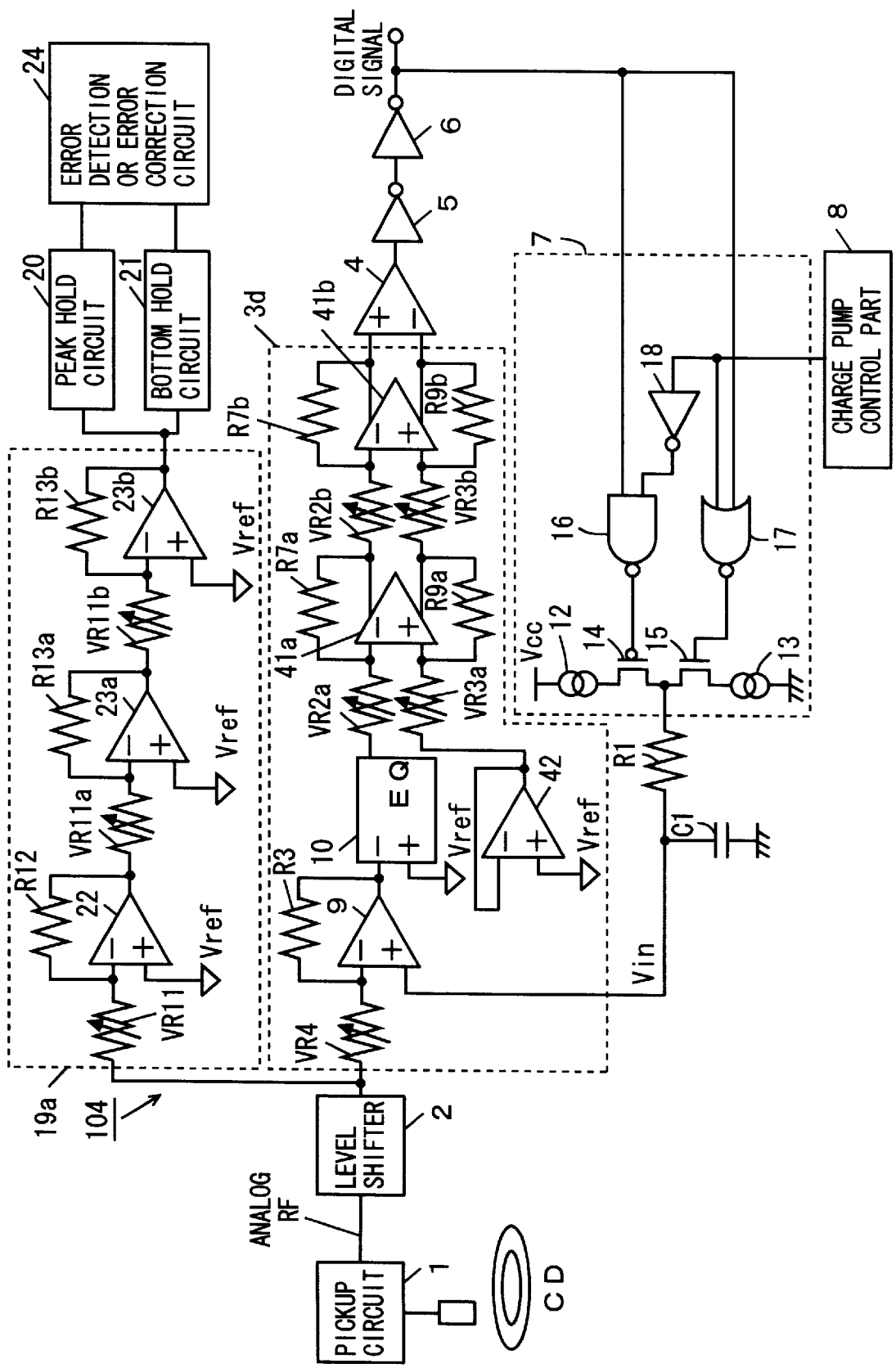
FIG. 7 is a circuit diagram showing the structure of a signal reproducing circuit for an optical disk according to a fifth embodiment of the present invention.

A signal reproducing circuit for an optical disk according to a fifth embodiment of the present invention is now described with reference to FIG. 7. FIG. 7 is a circuit diagram showing the structure of the signal reproducing circuit for an optical disk according to the fifth embodiment of the present invention.

The signal reproducing circuit 104 shown in FIG. 7 is different from that shown in FIG. 6 in points that the second operational amplifier circuit 41 is replaced with two stages of eighth and ninth operational amplifier circuits 41a and 41b and the fourth operational amplifier circuit 23 is replaced with two stages of tenth and eleventh operational amplifier circuits 23a and 23b. The remaining points of the signal reproducing circuit according to the fifth embodiment are similar to those of the signal reproducing circuit shown in FIG. 6, and hence identical parts are denoted by the same reference numerals to omit redundant description.

In the eighth operational amplifier circuit 41a, a variable resistor VR2a is connected to an inversion input terminal, an output terminal of a twelfth operational amplifier circuit 42 is connected to a non-inversion input terminal through a variable resistor VR3a, a resistor R7a is connected between the inversion input terminal and an inversion output terminal, and a resistor R9a is connected between the non-inversion input terminal and a non-inversion output terminal. A reference voltage Vref is supplied to a non-inversion input terminal of the twelfth operational amplifier circuit 42, so that the twelfth operational amplifier circuit 42 functions as a buffer. The gain of the eighth operational amplifier circuit 41a can be switched in eight stages within the range of 0 dB to 12 dB by changing the resistance values of the variable resistors VR2a and VR3a.

In the ninth operational amplifier circuit 41b, a variable resistor VR2b is connected to an inversion input terminal, a variable resistor VR3b is connected to a non-inversion input terminal, a resistor R7b is connected between the inversion input terminal and an inversion output terminal, and a resistor R9b is connected between the non-inversion input terminal and a non-inversion output terminal. The inversion output terminal of the ninth operational amplifier circuit 41b is connected to a non-inversion input terminal of a comparator 4, and the non-inversion output terminal is connected to an inversion input terminal of the comparator 4. The gain of the ninth operational amplifier circuit 41b can be switched in two stages of 6 dB and 12 dB by changing the resistance values of the variable resistors VR2b and VR3b.

In the tenth operational amplifier circuit 23a, a variable resistor VR11a is connected to an inversion input terminal, the reference voltage Vref is supplied to a non-inversion input terminal, and a resistor R13a is connected between the inversion input terminal and an output terminal. The gain of the tenth operational amplifier circuit 23a can also be switched in eight stages within the range of 0 dB to 12 dB by changing the resistance value of the variable resistor VR11a, similarly to the eighth operational amplifier circuit 41a.

In the eleventh operational amplifier circuit 23b, a variable resistor VR11b is connected to an inversion input terminal, the reference voltage Vref is supplied to a non-inversion input terminal, and a resistor R13b is connected between the inversion input terminal and an output terminal. The gain of the eleventh operational amplifier circuit 23b can also be switched in two stages of 6 dB and 12 dB by changing the resistance value of the variable resistor VR11b, similarly to the ninth operational amplifier circuit 41b.

In this embodiment, a first operational amplifier circuit 9 corresponds to the first amplifier circuit, the eighth operational amplifier circuit 41a corresponds to the second amplifier circuit, the ninth operational amplifier circuit 41b corresponds to the third amplifier circuit, a third operational amplifier circuit 22 corresponds to the first detection amplifier circuit, the tenth operational amplifier circuit 23a corresponds to the second detection amplifier circuit, and the eleventh operational amplifier circuit 23b corresponds to the third detection amplifier circuit.

According to this embodiment, as hereinabove described, an operational amplifier circuit on an output side of an RF amplifier 3d or 19a is replaced with two stages of operational amplifier circuits so that the front-stage eighth and tenth operational amplifier circuits 41a and 23a can finely control the gains and the rear-stage ninth and eleventh operational amplifier circuits 41b and 23b can largely control the gains.

Figure 8:
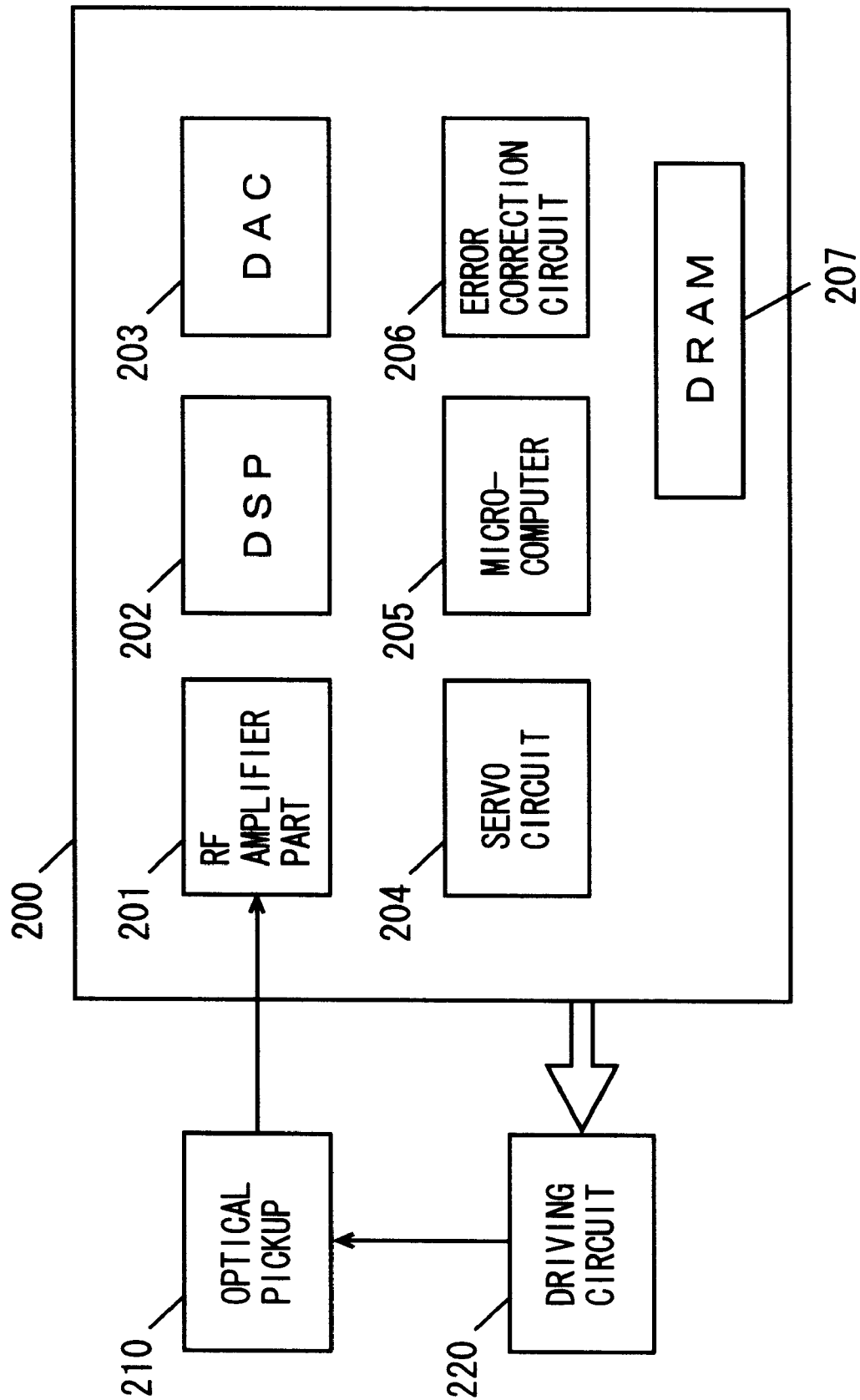
FIG. 8 is a block diagram showing the structure of a semiconductor integrated circuit for a CD-ROM drive including the signal reproducing circuit according to the present invention.
Figure 9:
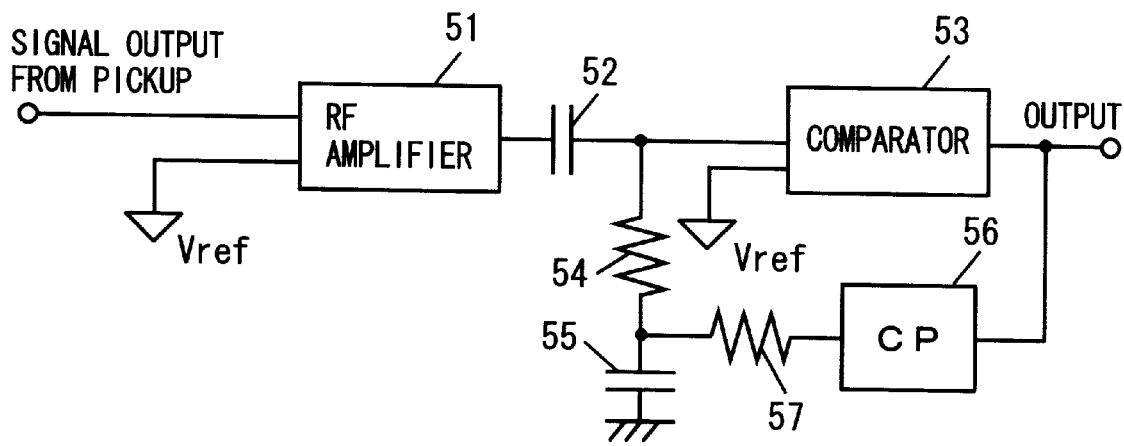
FIG. 9 is a circuit diagram showing the structure of a conventional signal reproducing circuit for an optical disk.

The signal reproducing circuit according to each of the aforementioned embodiments can be employed as an RF amplifier part of a semiconductor integrated circuit for a CD-ROM drive. An example of such employment is now described. FIG. 8 is a block diagram showing the structure of a semiconductor integrated circuit for a CD-ROM drive, employing the signal reproducing circuit according to each of the aforementioned embodiments as an RF amplifier part.

The semiconductor integrated circuit 200 shown in FIG. 8 includes the RF amplifier part 201, a DSP (digital signal processor) 202, a DAC (digital-to-analog converter) 203, a servo circuit 204, a microcomputer 205, an error correction circuit 206 and a DRAM (dynamic random access memory) 207.

The semiconductor integrated circuit 200 is a CMOS (complementary metal oxide semiconductor) integrated circuit formed by integrating the RF amplifier part 201, the DSP 202, the DAC 203, the servo circuit 204, the microcomputer 205, the error correction circuit 206 and the DRAM 207 into one chip through a CMOS process. In consideration of the cost, the DRAM 207 may alternatively be formed on another chip so that the RF amplifier part 201, the DSP 202, the DAC 203, the servo circuit 204, the microcomputer 205 and the error correction circuit 206 are integrated into a one-chip CMOS integrated circuit and these chips are sealed in the same package.

An optical pickup 210 coverts data recorded on a CD-ROM disk to an RF signal and outputs the RF signal to the RF amplifier part 201. The RF amplifier part 201 is formed by the signal reproducing circuit shown in FIG. 7, for example, for forming a focus error signal, a tracking error signal, a reproduced signal (EFM signal) and the like from the input RF signal through the aforementioned processing and outputting these signals to the DSP 202. The RF amplifier part 201 may alternatively be formed by another signal reproducing circuit such as that shown in FIG. 1.

The DSP 202 and the servo circuit 204 create a control signal for controlling the optical pickup 210 from the focus error signal, the tracking error signal and the like and output the control signal to a driving circuit 220. The driving circuit 220 drives an actuator provided in the optical pickup 210 in response to the input control signal for controlling the optical pickup 210 to reproduce an excellent RF signal.

The error correction circuit 206 performs error correction on reproduced data with the DRAM 207, for converting the reproduced data to an analog signal through the DAC 203 and outputting the analog signal when reproducing a sound signal.

The microcomputer 205 serves as a system controller controlling operations of the overall CD-ROM drive and transmits/receives data etc. to/from the DSP 202 etc. at need, so that the CD-ROM drive executes various operations.

As hereinabove described, the semiconductor integrated circuit 200 shown in FIG. 8 employs the signal processing circuit capable of implementing the function of adjusting the slice level with a small-scale circuit area while keeping the circuit at a high speed as the RF amplifier part 201. Thus, a miniature one-chip CMOS integrated circuit for a CD-ROM drive having high performance can be implemented by integrating the signal processing circuit with other blocks into one chip through the CMOS process.

Each of the aforementioned embodiments can be modified as follows, to attain similar functions/effects:

(1) The output side of the charge pump circuit 7 is connected to the non-inversion input terminal of the waveform shaping circuit 10 through the resistor R1 and the positive electrode of the integration capacitor C1 is connected between the resistor R1 and the non-inversion input terminal of the waveform shaping circuit 10. The reference voltage Vref is input in the non-inversion input terminal of the first operational amplifier circuit 9.

(2) The output side of the charge pump circuit 7 is connected to the non-inversion input terminal of the second operational amplifier circuit 11 or 41 through the resistor R1, and the positive electrode of the integration capacitor C1 is connected between the resistor R1 and the non-inversion input terminal of the second operational amplifier circuit 11 or 41. The reference voltage Vref is input in the non-inversion input terminal of the first operational amplifier circuit 9.

(3) The RF amplifier 3 is formed by a single operational amplifier circuit.

(4) The error detection or correction circuit 24 operates:
(a) to detect that the peak value drops below a constant level and determine a flaw on a disk surface;
(b) to detect that the bottom value exceeds a constant level and determine mirror modulation; or
(c) to control the gain of the RF amplifier 3, 3a, 3b, 3c or 3d or the RF amplifier 19 or 19a with the difference between the peak value and the bottom value.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A signal processing circuit comprising:
an amplifier circuit amplifying an input signal;
a conversion circuit converting an output from said amplifier circuit to a digital signal on the basis of a first voltage reference value; and
a feedback circuit integrating said digital signal from said conversion circuit and feeding back integrated said digital signal as a second voltage reference value of said amplifier circuit, wherein
said amplifier circuit amplifies the difference between said input signal and said second reference value, and wherein
said amplifier circuit includes at least two stages of amplifier circuits formed by a first amplifier circuit located on an input side and a second amplifier circuit located on an output side.

2. The signal processing circuit according to claim 1, wherein
at least part of said amplifier circuit includes a complete differential amplifier circuit, and
one output of said complete differential amplifier circuit is input in said conversion circuit as said first reference value.

3. The signal processing circuit according to claim 1, wherein
said feedback circuit integrates said digital signal from said conversion circuit and feeds back integrated said digital signal to said first amplifier circuit.

4. The signal processing circuit according to claim 1, wherein
said feedback circuit includes:
an integration capacitor, and
a charging/discharging circuit charging/discharging said integration capacitor in response to the level of said digital signal from said conversion circuit.

5. A signal processing circuit comprising:
an amplifier circuit amplifying an input signal;
a conversion circuit converting an output from said amplifier circuit to a digital signal on the basis of a first voltage reference value; and
a detection circuit, comprising a detection amplifier in parallel with the amplifier circuit, detecting a dc component of a signal not yet amplified by said amplifier circuit;
whereby correct peak and bottom values are obtained.

6. The signal processing circuit according to claim 5, further comprising a feedback circuit integrating said digital signal from said conversion circuit and feeding back integrated said digital signal as a second reference value of said amplifier circuit.

7. The signal processing circuit according to claim 6, wherein
said amplifier circuit amplifies the difference between said input signal and said second reference value.

8. The signal processing circuit according to claim 7, wherein
said amplifier circuit includes at least two stages of amplifier circuits formed by a first amplifier circuit located on an input side and a second amplifier circuit located on an output side.

9. The signal processing circuit according to claim 8, wherein
said feedback circuit integrates said digital signal from said conversion circuit and feeds back integrated said digital signal to said first amplifier circuit.

10. The signal processing circuit according to claim 7, wherein
at least part of said amplifier circuit includes a complete differential amplifier circuit, and
one output of said complete differential amplifier circuit is input in said conversion circuit as said first reference value.

11. The signal processing circuit according to claim 7, wherein
said amplifier circuit includes:
a first amplifier circuit located on an input side,
a waveform shaping circuit shaping the waveform of an output signal from said first amplifier circuit,
a second amplifier circuit amplifying an output signal from said waveform shaping circuit, and
a third amplifier circuit located on an output side for amplifying an output signal from said second amplifier circuit,
said second and third amplifier circuits include complete differential amplifier circuits, and
one output of said third amplifier circuit is input in said conversion circuit as said first reference value.

12. The signal processing circuit according to claim 7, wherein
said feedback circuit includes:
an integration capacitor, and
a charging/discharging circuit charging/discharging said integration capacitor in response to the level of said digital signal from said conversion circuit.

13. The signal processing circuit according to claim 5, wherein
said detection circuit includes at least either a peak hold circuit detecting and holding a peak value of said signal not yet amplified by said amplifier circuit or a bottom hold circuit detecting and holding a bottom value of said signal not yet amplified by said amplifier circuit.

14. The signal processing circuit according to claim 5, wherein
said detection circuit includes:
at least two stages of detection amplifier circuits formed by a first detection amplifier circuit located on an input side and a second detection amplifier circuit located on an output side,
a peak hold circuit detecting and holding a peak value of an output signal from said second detection amplifier circuit, and
a bottom hold circuit detecting and holding a bottom value of said output signal from said second detection amplifier circuit.

15. The signal processing circuit according to claim 5, where in
said detection circuit includes:
a first detection amplifier circuit located on an input side,
a second detection amplifier circuit amplifying an output signal from said first detection amplifier circuit,
a third detection amplifier circuit amplifying an output signal from said second detection amplifier circuit,
a peak hold circuit detecting and holding a peak value of an output signal from said third detection amplifier circuit, and
a bottom hold circuit detecting and holding a bottom value of said output signal from said third detection amplifier circuit.

16. A semiconductor integrated circuit comprising:
a signal processing circuit processing an output signal from an optical pickup, wherein said signal processing circuit is integrated with another circuit into one chip by a CMOS integrated circuit, and said signal processing circuit includes:

an amplifier circuit amplifying said output signal from said optical pickup, a conversion circuit converting an output from said amplifier circuit to a digital signal on the basis of a first voltage reference value, and a feedback circuit integrating said digital signal from said conversion circuit and feeding back integrated said digital signal as a second voltage reference value of said amplifier circuit, and wherein said signal processing circuit further includes a detection circuit detecting a dc component of a signal not yet amplified by said amplifier circuit, and said amplifier circuit includes at least two stages of amplifier circuits formed by a first amplifier circuit located on an input side and a second amplifier circuit located on an output side.

17. The semiconductor integrated circuit according to claim 16, wherein said detection circuit includes at least either a peak hold circuit detecting and holding a peak value of said signal not yet amplified by said amplifier circuit or a bottom hold circuit detecting and holding a bottom value of said signal not yet amplified by said amplifier circuit.

18. The semiconductor integrated circuit according to claim 16, wherein said feedback circuit integrates said digital signal from said conversion circuit and feeds back integrated said digital signal to said first amplifier circuit.

* * * * *